Patented Aug. 3, 1943

2,325,987

UNITED STATES PATENT OFFICE 2,325,987

POLYSTYRENE COATING COMPOSITION

Robert C. Swain, Riverside, and Pierrepont Adams, Stamford, Conn., assignors to American Cyanamid Company, New York, N. Y., a corporation of Maine No Drawing. Application December 26, 1940, Serial No. 371,781

4 Claims. (Cl. 260—42)

This invention relates to coating compositions containing polystyrene and melamine-formaldehyde resins.

An object of this invention is to improve the physical and chemical properties of coating compositions containing polystyrene, e. g., solvent resistance, etc., as well as to decrease the thermoplasticity.

Another object of this invention is to provide compositions containing polystyrene and compatible proportions of compatible melamine-formaldehyde resins.

These and other objects are attained by blending polystyrene with not more than 40% (total solids weight basis) of a melamine-formaldehyde resin which has been alkylated with an alcohol containing at least 6 carbon atoms wherein the molal ratio of formaldehyde to melamine is at least about 4:1.

The following examples in which the proportions are in parts by weight are given by way of illustration and not in limitation.

Example 1

| | Parts |
|---|---|
| Melamine-formaldehyde resin "A" | 10 |
| Polystyrene | 90 |

A composition containing these ingredients is prepared by admixing 20 parts of melamine-formaldehyde resin "A" solution (50% resin) with 360 parts of "polystyrene stock solution" (containing 25% of polystyrene and 75% of toluene). Films of the composition are applied to metal objects and baked at a temperature of about 135° C. for about one-half hour. The product is a hard, transparent coating having good film strength.

Example 2

| | Parts |
|---|---|
| Melamine-formaldehyde resin "B" | 25 |
| Polystyrene | 75 |

A composition containing these ingredients is prepared by admixing 50 parts of melamine-formaldehyde resin "B" solution (50% resin) with 300 parts of "polystyrene stock solution." Films of the composition are applied to metal objects and baked at a temperature of about 135° C. for about one-half hour. The product formed is a very hard, clear coating.

Example 3

| | Parts |
|---|---|
| Melamine-formaldehyde resin "C" | 10 |
| Polystyrene | 90 |

A composition containing these ingredients is prepared by admixing 20 parts of melamine-formaldehyde resin "C" solution (50% resin) with 360 parts of "polystyrene stock solution." Films of the composition are applied to metal objects and baked at a temperature of about 135° C. for about one-half hour. A water-white film having good chemical properties is formed.

*Preparation of melamine-formaldehyde resin "A"*

| | Parts |
|---|---|
| Melamine (1 mol) | 126 |
| Formalin (5 mols) (37% formaldehyde in water) | 405.5 |
| n-Hexyl alcohol | 500 |
| Methyl alcohol | 200 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 80–85° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. This solution is essentially a hexylated resin in hexyl alcohol, all or nearly all of the methanol having been eliminated from it during the distillation. The resulting resin solution may be diluted to about 50% solids with any desired solvent or diluent, e. g., xylene.

*Preparation of melamine-formaldehyde resin "B"*

| | Parts |
|---|---|
| Melamine-formaldehyde (molal ratio 1:4) spray-dried powder | 200 |
| 2-ethyl hexanol | 280 |
| n-Butanol | 320 |
| Methyl acid phosphate | 4 |

The melamine-formaldehyde condensation product is obtained by refluxing melamine and formalin (37% formaldehyde in water) in the molal ratio of 1:4 at a pH of about 7-9 for about 3 hours and then spray-drying.

The spray-dried melamine-formaldehyde powder, octanol, butanol and methyl acid phosphate are heated to about 100-105° C. in 30 minutes and refluxed about 30 minutes. This solution is vacuum concentrated at about 50-70° C. to form a product containing about 50% solids.

*Preparation of melamine-formaldehyde resin "C"*

|  | Parts |
|---|---|
| Melamine (1 mol) | 126 |
| Formalin (5 mols) (37% formaldehyde in water) | 405.5 |
| Benzyl alcohol | 600 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 93-95° C. at atmospheric pressure for 6-12 hours. The water is removed by azeotropic distillation from the reaction mixture during the reflux operation beginning preferably after about 2-5 hours have elapsed and the water so removed is separated from the reflux condensate in the water trap. When the reflux condensate is substantially anhydrous the vapor temperature will be about 100-105° C. The pressure is lowered sufficiently to reduce the vapor temperature to about 85-90° C. and the resin solution is concentrated to about 60-70% solids by vacuum distillation. The resulting resin solution may be diluted to about 50% solids with any desired solvent or diluent, e. g., xylene.

Alkylated melamine-formaldehyde resins may be produced in accordance with the procedures outlined above, as well as in any other suitable manner. Aqueous syrups of melamine-formaldehyde resins may be first produced and then alkylated either simultaneously with dehydration or subsequent to dehydration. Generally the simultaneous condensation of melamine, formaldehyde and a suitable alcohol is used because of convenience. In order to facilitate the alkylation with the higher alcohols, e. g., the hexyl alcohols and the octanols, a low boiling alcohol such as methanol or butanol may be mixed with the higher alcohol, thereby assisting in removing the water and causing the reaction to take place readily at somewhat lower temperatures than would otherwise be required. The low boiling alcohol is removed by distillation after the reaction is completed. Another method for producing resins alkylated with a higher alcohol is to alkylate the melamine-formaldehyde resin with a low boiling alcohol such as methanol and subsequently replacing it with the desired higher alcohol, distilling out the low boiling alcohol. The condensation may be carried out either with or without an acid catalyst and in some instances basic catalysts may desirably be utilized.

The melamine-formaldehyde resins vary slightly according to minor variations in control during their production and in some instances small proportions of a suitable solvent material, e. g., benzene, toluene, xylene, etc., may be added to the original solutions of polystyrene and melamine-formaldehyde resin in order to produce perfectly clear solutions if such solutions are not originally obtained.

While formaldehyde has been used in the previous examples, it will be obvious that the various polymers of formaldehyde, e. g., paraformaldehyde, or substances which yield formaldehyde may be used in place of part or all of the formaldehyde.

As indicated by the above examples polystyrene has been found to be compatible with not more than 40% (total solids weight basis) of a melamine-formaldehyde resin alkylated with an alcohol containing at least 6 carbon atoms wherein the molal ratio of formaldehyde to melamine is at least about 4:1. It has also been found that up to about 10% of melamine resins alkylated with n-butyl alcohol and wherein the molal ratio of formaldehyde to melamine is about 6:1 is compatible with polystyrene. While higher ratios of formaldehyde to melamine than 6:1 may be used, it is generally undesirable inasmuch as formaldehyde is lost during the curing so that usually the product in its cured condition does not contain more than about 6 mols of formaldehyde to 1 mol of melamine. The percentage composition in each instance in the last paragraph is on a total solids weight basis.

The resins may be alkylated with any of the straight chain or branched chain alcohols containing at least 6 carbon atoms, preferably 6-8 carbon atoms, as well as with aralkyl types of alcohols such as benzyl alcohol. The term "alkylated melamine-formaldehyde resin" is intended to denote compositions which are reacted with an alcohol.

Our products may be plasticized with a wide variety of materials such as the alkyl phthalates, tricresyl phosphate, various alkyd resins, etc.

Various fillers, pigments, dyes and lakes may be added to our compositions, e. g., lithopone, zinc oxide, titanium oxide, ferric oxide, Prussian blue, toluidine red, malachite green, mica, glass fibers, ground glass, powdered silica, etc.

Curing catalysts may be incorporated in the compositions to effect a more rapid curing of the melamine-formaldehyde resins or to enable the resin to be cured at lower temperatures than indicated in the above examples. Such substances are, for instance, phosphoric acid, ammonium salts of phosphoric acid, etc.

Other resinous compositions may be included in various coating compositions, e. g., urea-formaldehyde resins, alkyd resins, ethyl cellulose, cellulose acetate, phenol-formaldehyde resins, nitrocellulose, etc., as well as in varnishes, etc.

Our mixed products are especially useful in electrical insulating applications as well as in many varied coating compositions. Our products have good electrical characteristics and also excellent water resistance. The melamine-formaldehyde resins which are added to the polystyrene raise the relatively low softening point of the latter so that our mixtures may be used in many applications where the materials are necessarily subjected to temperatures which would ordinarily soften the polystyrene resins. Furthermore, the melamine-formaldehyde resins reduce the sensitivity of polystyrene to various solvent materials such as the aromatic hydrocarbons.

The term "compatible" as used herein is intended to denote compositions, films of which are clear and homogeneous after baking.

Obviously, many modifications and variations in the processes and compositions described above may be made without departing from the spirit and scope of the invention as defined in the appended claims.

We claim:

1. A coating composition containing substantial amounts of polystyrene and a melamine-formaldehyde resin which has been reacted with a monohydric alcohol containing between 6 and 8 carbon atoms, wherein the molal ratio of formaldehyde to melamine is at least about 4:1 and wherein the weight ratio of polystyrene to melamine resin is at least about 3:2.

2. A coating composition containing substantial amounts of polystyrene and a melamine-formaldehyde resin which has been reacted with n-hexyl alcohol, wherein the molal ratio of formaldehyde to melamine is at least about 4:1 and wherein the weight ratio of polystyrene to melamine resin is at least about 3:2.

3. A coating composition containing substantial amounts of polystyrene and a melamine-formaldehyde resin which has been reacted with 2-ethyl hexanol wherein the molal ratio of formaldehyde to melamine is at least about 4:1 and wherein the weight ratio of polystyrene to melamine resin is at least about 3:2.

4. A coating composition containing substantial amounts of polystyrene and a melamine-formaldehyde resin which has been reacted with benzyl alcohol wherein the molal ratio of formaldehyde to melamine is at least about 4:1 and wherein the weight ratio of polystyrene to melamine resin is at least about 3:2.

ROBERT C. SWAIN.
PIERREPONT ADAMS.